United States Patent
Schroeder

[15] 3,704,408
[45] Nov. 28, 1972

| [54] | CONTROLLED RECTIFIER FIRING SYSTEM WITH VOLTAGE COMPENSATION |
|---|---|
| [72] | Inventor: Thaddeus Schroeder, Sterling Heights, Mich. |
| [73] | Assignee: General Motors Corporation, Detroit, Mich. |
| [22] | Filed: Nov. 15, 1971 |
| [21] | Appl. No.: 198,545 |
| [52] | U.S. Cl. ................................................321/5 |
| [51] | Int. Cl. ................................................H02m 7/20 |
| [58] | Field of Search...........307/252 N, 252 P, 252 Q; 321/5, 47 |

[56] References Cited

UNITED STATES PATENTS

| 3,098,977 | 7/1963 | Sciaky | 328/69 |
| 3,424,970 | 1/1969 | Ross | 321/5 |
| 3,456,176 | 7/1969 | Wilkerson | 318/302 |
| 3,593,105 | 7/1971 | Brohaugh | 321/5 |

*Primary Examiner*—William M. Shoop, Jr.
*Attorney*—E. W. Christen et al.

[57] ABSTRACT

Firing angle control for controlled rectifiers in a bridge rectifier connected with an alternating voltage input is developed from control voltages derived from the alternating voltage input. In a three-phase system, each line-to-line voltage is used as a ramp in generating gate firing signals for an associated controlled rectifier in a respective line. To maintain the output at a constant voltage level, automatic compensation for voltage variations at the input is provided by modifying the ramp voltages to advance or retard the firing angle when the input is increased or decreased respectively: in one embodiment, the ramp voltages are combined with DC offset voltages and AC ripple voltages to compensate for voltage variations.

3 Claims, 11 Drawing Figures

CONTROLLED RECTIFIER FIRING SYSTEM WITH VOLTAGE COMPENSATION

This invention relates to a gate firing system for controlled rectifiers in a bridge rectifier connected with a three-phase input where each line-to-line voltage serves as a control voltage controlling the firing point of an associated controlled rectifier in a respective line wherein compensation for input voltage variations is provided by modifying the control voltages by adding preselected offset voltages and wherein optimum compensation for voltage variations by the input voltage is provided by synthesis of control voltages composed of component segments of the line-to-line sinusoids.

Controlled rectifiers are generally known for connecting alternating current voltage sources with electrical loads when it is desired to regulate the voltage level at the load. In particular, controlled rectifiers are frequently used in full wave bridge networks interconnecting alternating current sources to electrical loads. The inclusion of controlled rectifiers in the bridge rectifier affords requisite conduction regulation whereby the DC output voltage from the bridge rectifier is controllable. This control feature follows from the firing angle control of the bridge rectifier controlled rectifiers.

In addition to AC to DC converters, controlled rectifiers are useful for the purpose of voltage regulation in AC to AC systems wherein an alternating current source is supplied an electrical load through an AC to AC converter or cycloconverter. In a manner similar to that for voltage regulation in AC to DC converters, the controlled rectifiers in an AC to AC system provide voltage regulation through gate firing angle control.

The use of controlled rectifiers in the above applications is conventional and various gate firing control schemes therefore are known in the art. Phase shifting networks providing gate firing control are commonly used; however, such networks are unacceptable in certain applications since the response time of the phase shift network causes an inherent time delay between the requirement for the changed firing angle and the actual change.

Another type of conventional gate firing angle control arrangement uses ramp voltages and DC reference voltages to regulate the occurrence of gate firing signals for bridge rectifier controlled rectifiers. In arrangements of this type, it is necessary to synchronize the ramp signals with the voltage available from the alternating current source. One firing system incorporating the ramp voltage technique of gate firing angle control is disclosed in U.S. Pat. No. 3,424,970 Ross wherein phase or line-to-neutral voltages are used as voltage control ramps for controlled rectifiers in a full wave bridge rectifier. It should be apparent that synchronization between the line-to-line voltages and the phase voltages is inherent, thus simulating more conventional ramp control voltages. Regulation wherein line-to-neutral phase voltages are used, as shown in the Ross patent, to gate controlled rectifiers in bridge rectifier circuits is limited in that the conduction angle cannot exceed 120° without loss of control as the control or reference DC is certain of intersection only when the conduction angle is 120° or less; thus, this firing arrangement cannot be used when a greater conduction angle is needed. As disclosed in the Ross patent, voltage regulation over a portion of the total control range is inherent in view of the use of the line-to-neutral voltage as a control ramp. As noted therein, if operation is confined to a certain portion of the total control range, full compensation is obtained. The extent of the portion of the total control range wherein full compensation is obtained depends on the type of load.

If it is desirable that the DC voltage output from the bridge rectifier be maintained substantially constant over the entire range of control, other voltage compensation to accommodate variations in the input is required. U.S. Pat. No. 3,098,977 Sciaky discloses one such scheme of voltage compensation for a three-phase electrical system. As discussed in the specification of this patent, sinusoidal voltages are offset by DC reference voltages such that changes in amplitude of the sinusoid ensure compensation in the output DC. This compensation has an inherently slow response as a result of the time required for the filtered DC offset voltage to reflect input amplitude changes.

The present invention provides voltage compensation in a control arrangement for regulating the firing angle of controlled rectifiers in AC to DC converters or AC to AC cycloconverters. In the instant invention, each line-to-line voltage from a three-phase source of alternating current is used as a control voltage to gate an associated controlled rectifier in a respective line. In this manner, 120° of gate firing control is possible with a six controlled rectifier bridge rectifier and 180° of gate firing control is possible with a three controlled rectifier, three diode bridge rectifier, thus providing complete regulation of the DC output voltage from the bridge rectifier. Voltage compensation is included in the instant invention by combining a DC offset voltage or a DC voltage with ripple with the respective control voltages. The compensation when the ripple is included is greater than that provided by a filtered DC offset voltage, and as disclosed hereinafter, a unique optimum compensation offset voltage can be combined with the control line-to-line voltages when optimum compensation is required.

In view of the foregoing, it is an object of the present invention to provide a power control system wherein sections of line-to-line voltages from a three-phase source are used to regulate the firing angle of associated devices such as controlled rectifiers included in respective voltage lines wherein improved voltage compensation and a full range of firing angle control are provided.

Another object of the present invention is to provide a power control system wherein sections of respective line-to-line voltages from a three-phase system are used to control the gate firing angle of associated controlled rectifiers in respective lines wherein a control voltage is available to ensure regulation of the firing angle over the entire range of control and wherein compensation including an offset DC voltage with ripple is provided to compensate the output voltage for variations in the input voltage.

These and other objects, advantages, and features of the present invention will become more readily apparent as reference is had to the accompanying specification and drawings wherein.

Figure 1:
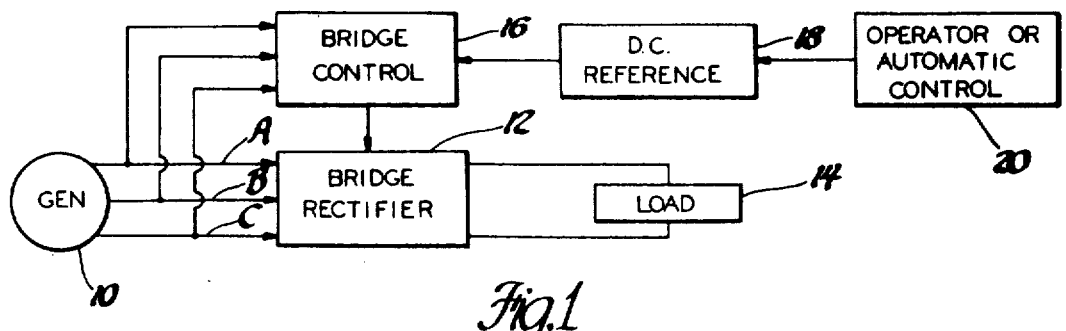
FIG. 1 is a schematic in block form of a bridge rectifier arrangement wherein the bridge rectifier controlled rectifiers are controlled in accordance with the present invention.

Reference should now be made to the drawings and more particularly to FIG. 1 wherein a circuit schematic in block form shows an AC to DC converter with bridge control according to the present invention. A generator 10 provides a three-phase output including phases A, B, and C on three output lines connected with the input of a bridge rectifier 12 developing a DC output for application to a load 14. The generator 10 can take a variety of forms generally known in the art of three-phase voltage generation. The bridge rectifier 12 in the present invention can include either six or three controlled rectifiers depending upon whether full wave or half-wave control is desired. Both types of bridge rectifiers are discussed hereinafter. The load 14 can take a variety of forms. In the following description, the load 14 is assumed to be either resistive or inductive with a free-wheeling diode.

Firing angle control of controlled rectifiers in the bridge rectifier 12 is developed in a bridge control 16 having inputs from the generator 10. The bridge control 16 develops ramp control voltages offset by appropriate voltages for purposes of compensation. To develop gate firing signals, these ramp control voltages are compared with a DC voltage from the DC reference source 18 wherein the DC level is set in response to a control from the operator or automatic control 20. The DC reference source 18 can take a variety of known forms, for example, a rectified and filtered AC voltage applied to an adjustable voltage divider. The bridge control 16 is essential to the present invention and is discussed in considerable detail hereinafter. A full wave bridge control arrangement is shown schematically in FIG. 2 and a half-wave bridge control arrangement is shown schematically in FIG. 11.

Figure 2:
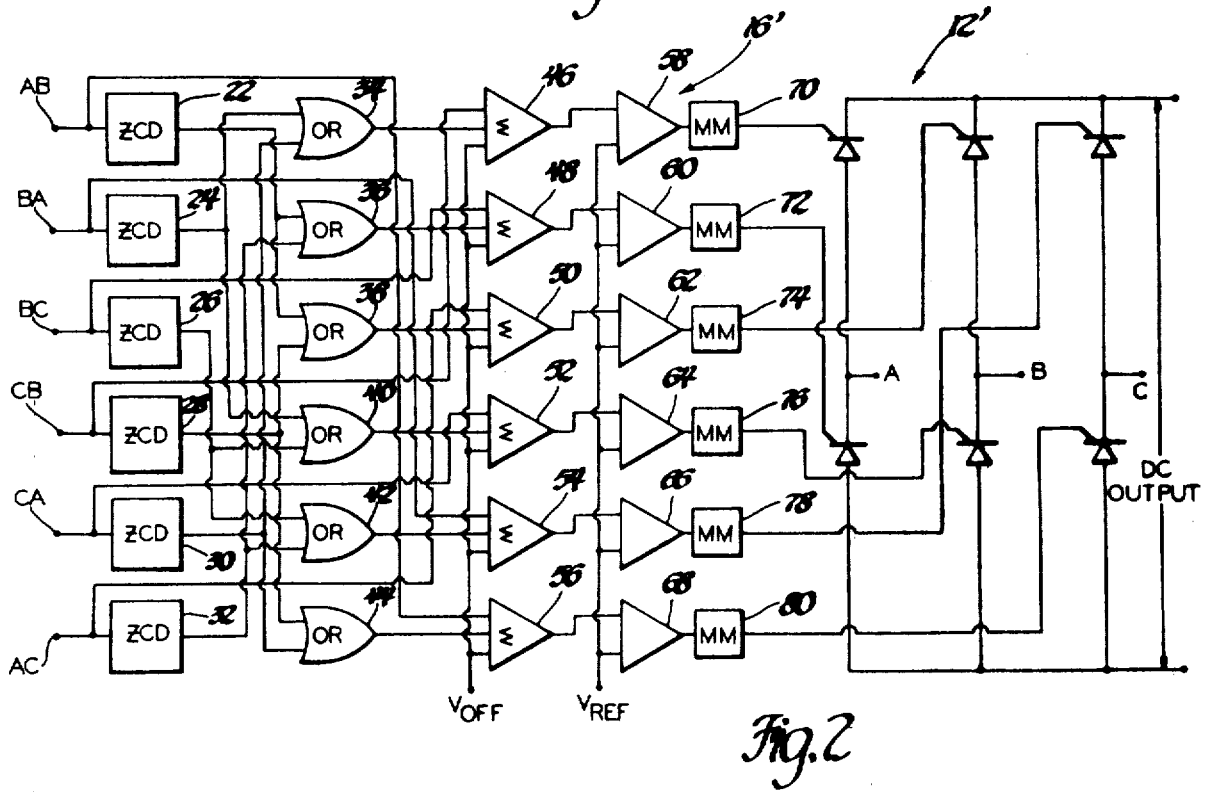
FIG. 2 is a schematic in block form of the bridge control of FIG. 1.

Reference should now be made to FIG. 2 wherein a bridge control arrangement for full wave control of a bridge rectifier including six controlled rectifiers is set forth. The bridge rectifier 12' in FIG. 2 includes six controlled rectifiers connected with the three-phase input voltages A, B, and C from a source of alternating current such as the generator 10 of FIG. 1. A DC output voltage is available from the bridge rectifier for connection to electrical loads. Regulation of the DC output voltage is provided by the bridge control 16' supplying gate firing signals to the respective controlled rectifiers. Each controlled rectifier shown in the schematic of FIG. 2 has its gate electrode connected to the bridge control network; it should be understood that a practical circuit would require both a gate and a cathode connection to provide requisite firing signals.

The bridge control arrangement is supplied six input line-to-line voltages identified at the input terminals to the bridge control as voltages AB, BA, BC, CB, CA, and AC. It should be appreciated that the three line-to-line voltages AB, BC, and CA conventionally associated with a three-phase source having line voltages A, B, and C are included and that the other three voltage inputs are merely the respective inverses of these three line-to-line voltages. BA is the inverse of AB, CB is the inverse of BC, and AC is the inverse of CA.

Figure 3:
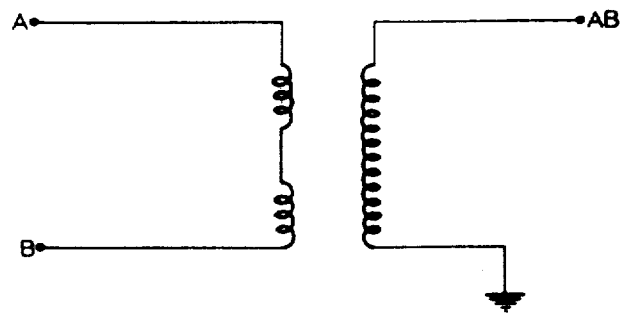
FIG. 3 is a circuit schematic depicting the development of voltages required in FIG. 2.

The circuit schematic of FIG. 3 shows the connection for voltages A and B, available from the source of alternating current required to develop the voltage AB. In FIG. 3, the voltage AB is developed; however, it should be understood that the voltages BC and CA are developed in similar fashion and that the inverses can be likewise obtained. In FIG. 3, voltage A and voltage B are connected across the input winding of a transformer and the voltage AB is available at the secondary winding between the output terminal and a reference potential conductor. All six input voltages to the bridge control 16' are developed in the manner illustrated for the voltage AB. It should be appreciated that the six voltages are identical except for phase. Each of the six voltages leads a respective voltage by 60° and lags another respective voltage by 60° such that the six voltages represent phase shifts from a selected reference of 0°, 60°, 120°, 180°, 240°, and 300°.

In the control of the present invention, a gate firing signal is developed when the magnitude of a DC reference voltage exceeds the magnitude of the ramp portion of a sine wave. For the full wave bridge of FIG. 2, the ramp can be the portion of the sine wave from 120° to 240°. Without the inclusion of an offset voltage for voltage compensation, the sine wave pivots about the 180° point with the effects discussed hereafter.

Figure 4:
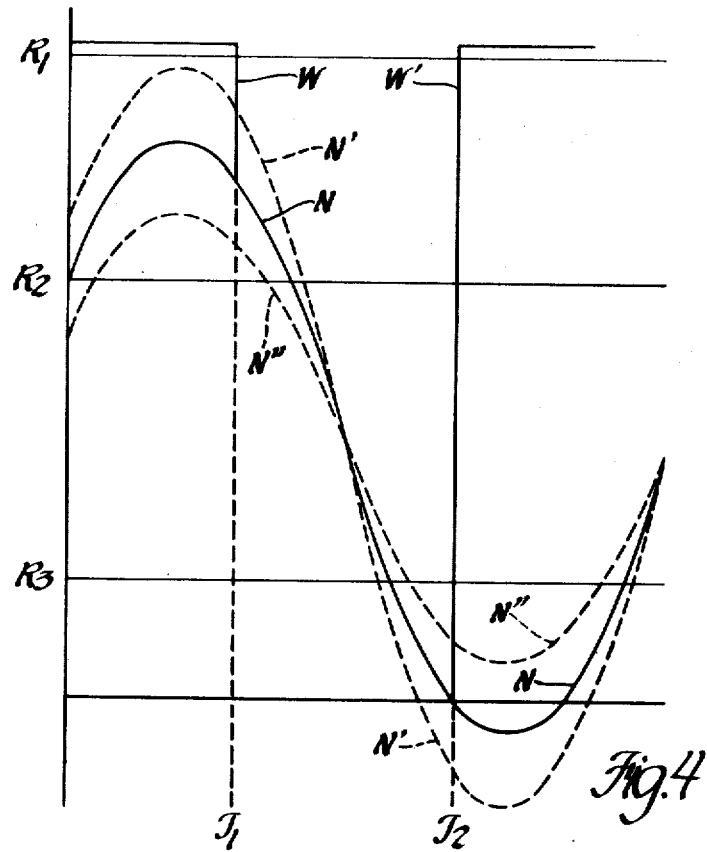
FIG. 4 is a graph showing the effects on the ramp control voltage of changes in voltage level at the input when the voltage pivots about the 180° phase point of the sine wave.

Reference should now be made to FIG. 4 which shows the effects on the ramp control voltage of changes in voltage level at the input when the voltage pivots about the 180° phase point of the sine wave. In the present invention, it is desired to use the 120° segments of the input sinusoid between the times $T_1$ and $T_2$. As shown in FIG. 4, $T_1$ occurs at the 120° point of the sine wave and $T_2$ occurs at the 240° point of the sine wave. The sine wave N is the nominal wave, whereas the sine wave N' shows the wave with increased amplitude and the sine wave N'' depicts the wave with decreased amplitude, both with respect to the nominal amplitude of the wave N. The vertical line portions W and W' define the sides of a well ensuring that a gate firing signal is developed in the interval $T_1$ to $T_2$ irrespective of the amplitudes of the reference and the sine wave. The development and function of the voltage portions W and W' are more completely set forth hereinafter. For present purposes, it is sufficient to understand that the sine wave ramp defined by the segment between $T_1$ and $T_2$, together with the vertical portions W and W', defines the gate firing control voltage.

In the control of the present invention, a gate firing signal is developed when the magnitude of a DC reference voltage exceeds the magnitude of the ramp portion of the sine wave in the interval $T_1$ to $T_2$. Three exemplary reference voltages are shown on the graph. Reference voltage $R_1$ has an amplitude exceeding the maximum amplitude of the ramp section of sine wave N'. Accordingly, the gate firing signal is developed at time $T_1$ after the reference voltage $R_1$ intersects the well portion W. It is apparent that the gate firing signal is developed at the time $T_1$ irrespective of the amplitude of the input voltage, N, N', or N''. It should be appreciated that this situation obtains when the bridge rectifier of FIG. I1 is providing maximum output voltage.

The reference voltage $R_2$ intersects the three sine wave ramp portions respectively associated with N, N', and N'' and gate firing signals are developed at the times of intersection. It should be observed that the decreased voltage amplitude associated with the waveform N'' advances the time of gate firing, thus compensating for a reduction in the source voltage. Additionally, it should be observed that the increased voltage amplitude associated with the waveform N' results in a delay in the firing point to compensate for the increased source voltage amplitude.

Figure 6:
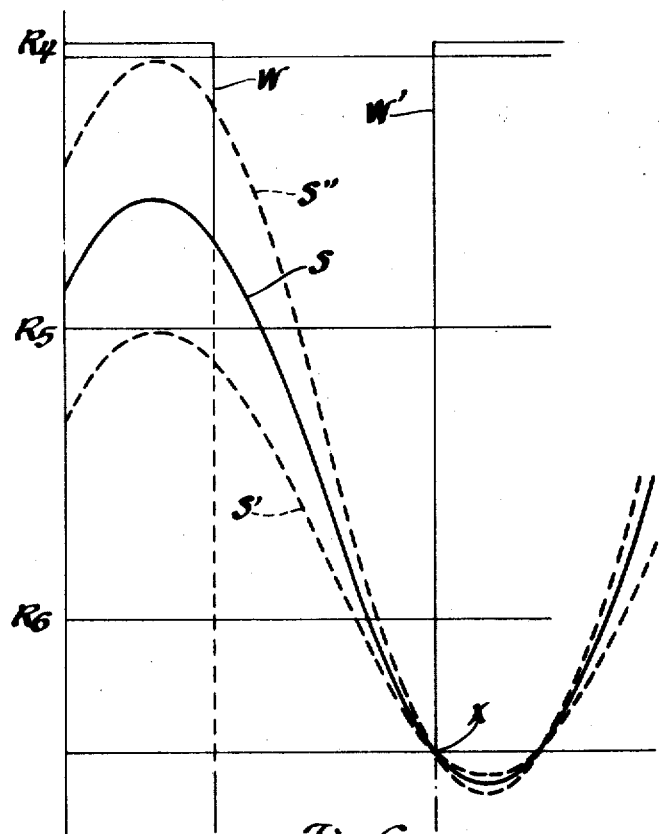
FIG. 6 is a graph depicting the effects on the ramp control voltage of changes in voltage amplitude when an offset voltage clamps the sinusoid to pivot at a preselected phase angle.

The reference voltage $R_3$ intersects the three sine wave ramp portions respectively associated with N, N', and N'' and gate firing signals are developed at the times of intersection. Unlike the compensation effect described for the reference voltage $R_2$, the effect of voltage variations on the times of gate firing signals for the reference voltage $R_3$ is to compound input voltage variations as they affect the output. As shown in the graph, the increase in voltage associated with the waveform N' advances the time of the gate firing signal, whereas compensation would dictate a delay in the gate firing signal. Likewise, a decrease in the amplitude of the sinusoid as exemplified by the waveform N'' causes a delay in the gate firing signal rather than an advance as would be required for compensation. All reference voltages intersecting the control voltages below the pivot point aggravate the adverse effects of source voltage variations. The foregoing description suggests one problem encountered and requiring attention in a system of compensation. The solution of this problem is reserved until the graphs of FIG. 6 are discussed.

Figure 5:
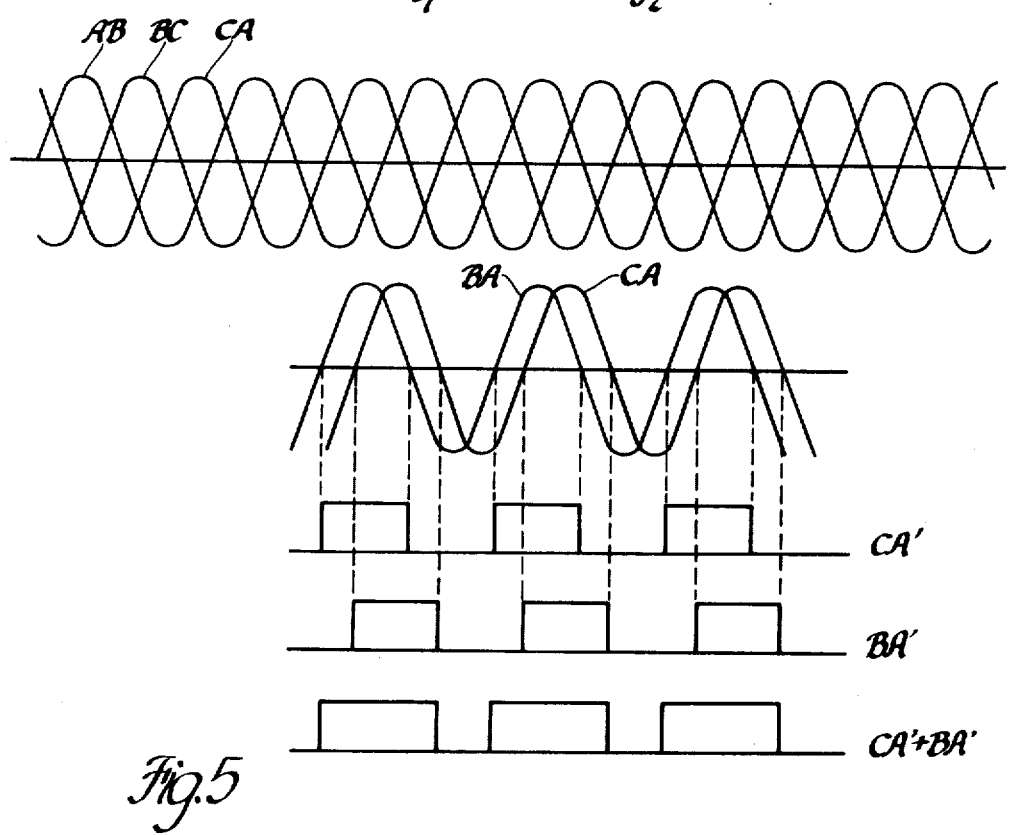
FIG. 5 is a timing diagram showing the development of signals defining the limits of the firing angle control range for FIG. 2.

Before pursuing the operation of the bridge control 16' of FIG. 2, reference should be made to FIG. 5 where the three-phase voltages AB, BC, and CA are graphically depicted, together with the voltage BA and logic signals derived from the voltages BA and CA. Two logic signals are shown, each having a high level value when the associated sinusoid is positive and a low level value when the associated sinusoid is negative. The logic signal derived from sinusoid CA is labeled CA' and the logic signal derived from the sinusoid BA is labeled BA'. A third pulse signal is shown and labeled CA' + BA'. It should be appreciated that the signal CA' + BA' is the logic OR of the pulse trains CA' and BA'. The logic process example of FIG. 5 is typical of the processes involved in the bridge control of FIG. 2 as described hereinafter.

Reference should again be made to FIG. 2 wherein the six input signals AB, BA, BC, CB, CA, and AC are applied to respective zero crossing detectors 22, 24, 26, 28, 30, and 32. Each zero crossing detector develops an output typified by the outputs BA' and CA' shown in FIG. 5 and described above. Accordingly, it should be understood that each output signal comprises a pulse train wherein a high level voltage is developed when the associated sinusoid is positive and a low level voltage is developed when the associated sinusoid is negative. These outputs are respectively connected in pairs to six OR gates 34, 36, 38, 40, 42, and 44.

Each of the OR gates develops an output pulse signal similar to that depicted in FIG. 5 and labeled CA' + BA'. The only difference between any pair of output signals is a phase angle. Each of the output signals from the OR gates provides a well of 120° duration. This, of course, is accomplished as shown in FIG. 5 by developing a high level output voltage for 240° and a low level output voltage or well during intervening 120° intervals. The respective wells define the time intervals during which gate firing signals are to be developed for individual controlled rectifiers in the bridge rectifier 12'.

Six summing amplifiers 46, 48, 50, 52, 54, and 56 combine sinusoidal wave sections and offset voltages with the gate firing wells. Assuming an offset voltage $V_{OFF}$ equal to the amplitude of the sinusoid at 240° but having a positive polarity, the summing amplifier outputs developed are outputs typified by the graph of FIG. 6. The amplitude of the high level voltage available from the OR logic gate drives the amplifier into saturation and accordingly, it alone is significant outside the associated 120° well. Within the well or gate firing interval, the sinusoid determines the amplifier output waveform with an offset determined by the voltage $V_{OFF}$. The waveform S in FIG. 6 has a nominal value and the waves S' and S'' deviate therefrom representing respectively decreased and increased input voltage amplitudes. The well portions W and W' are combined with the sine wave portion available to define the waveform during the gate firing interval. It should be observed that the sine wave segments pivot or revolve about the point X where the sine waves intersect the well portion W'. A comparison of FIGS. 4 and 6 discloses substantial similarity, the principal difference being the effect of the offset voltage.

The offset voltage enhances the ability of the rectifier control system to compensate for changes in the amplitude of the input sinusoid. Three reference voltages $R_4$, $R_5$, and $R_6$ are shown superposed on the graph of FIG. 6 to demonstrate the effects of this compensation derived from the offset voltage.

When the reference voltage is at the level $R_4$, a gate firing pulse is developed at the outset of the gate firing interval when the reference voltage $R_4$ intersects the well portion W irrespective of the amplitude of the sinusoid. When the reference voltage is at the level $R_5$, the gate firing signal is developed at the outset of the gate firing interval if the input voltage has the amplitude S', whereas it is developed at the intersection of the voltage $R_5$ with the respective sinusoid if the input has the amplitude represented by S or S''. A reference voltage at the level $R_6$ causes gate firing signals at the time of intersection with the respective sinusoid irrespective of which sinusoid is present. It should be appreciated that voltage compensation is provided throughout the gate firing interval such that the time of firing advances when the input voltage decreases in amplitude and similarly, the time of firing is delayed when the input voltage increases in amplitude. Of course, the advance in gate firing time cannot exceed the limits set by the well portions defining the 120° gate firing interval. The appropriate offset voltage to effect control of this type is readily obtained from a bridge rectifier coupled through an appropriately calibrated voltage divider. The voltage compensation generally set forth is similar to that of U.S. Pat. No. 3,098,977 Sciaky.

In FIG. 2, the output voltage from each of the six summers is applied to a comparator for comparison with a reference voltage $V_{REF}$. The six comparators 58, 60, 62, 64, 66, and 68 change output state when the amplitude of the associated reference voltage exceeds the voltage from the associated summing amplifier. On the occasion of a change in output state, a gate firing signal having a time of 120° at the frequency of operation is initiated by an associated multivibrator 70, 72, 74, 76, 78, and 80 to gate the associated controlled rectifier conductive and maintain it conductive throughout the ensuing 120°.

It should be appreciated that alternative trigger arrangements could be employed to accommodate variable frequency operation. Additionally, innumerable trigger circuits are known in the art which are readily adapted to gate the controlled rectifiers of the bridge rectifier 12'. Inasmuch as neither of these alternatives is essential to the present invention, no description or circuitry directed to details is included herein.

Reviewing the operation of FIG. 2, six input signals related to the three-phase source voltage supplied the bridge rectifier 12' are developed and applied to six zero crossing detectors. The input voltages are the line-to-line voltages AB, BC, and CA and their inverses. In this manner, six unique sinusoids are available representing successive 60° phase shifts. The six zero crossing detectors develop pulse trains in accordance with their respective associated input sinusoids. Each zero crossing detector output is connected with two of six OR logic gates and accordingly, each OR logic gate has two of the six zero crossing detector outputs connected with it. In this manner, the OR logic gates are operative to develop 120° gate firing intervals defined by 120° wells according to the pattern shown in FIG. 5. It should be understood that the timing sequence of the 120° wells is such that one gate firing interval commences each 60° and one gate firing interval, having completed 120° terminates at the same time. Each of the six gate firing intervals thus developed is modified by adding thereto sine wave portions and offset voltage portions in a summing amplifier to provide a firing control ramp for comparison in a voltage comparator. A reference voltage affording operator control or automatic control is connected with the voltage comparator and a change in output state by the voltage comparator initiates a monostable multivibrator pulse to fire the associated controlled rectifiers. Flexibility in this design is available with regard to the offset voltage, with regard to the trigger connection between the voltage comparator and the associated controlled rectifier, and with regard to the sine wave portions. The system provides a fast response, compensated control for the bridge rectifier 12'.

Figure 7:
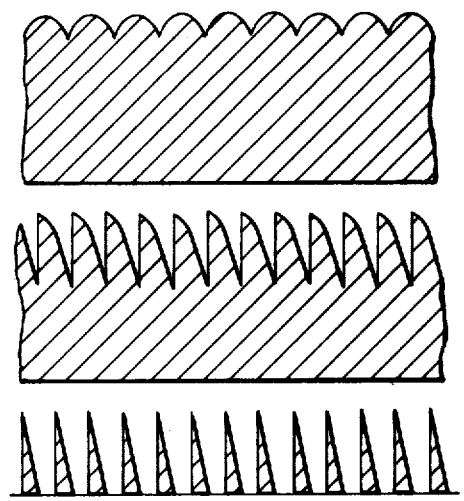
FIG. 7 is a graph showing the voltage developed at the output of the bridge rectifier for various gating firing angles.

FIG. 7 shows the output waveforms available from the bridge rectifier at full voltage and at two different levels of reduced voltage. It should be appreciated that the DC level is the average and accordingly, is controllable by regulation of the firing angle. With appropriate filtering, the waveforms of FIG. 7 could be nearly pure DC without AC ripple.

Figure 8:
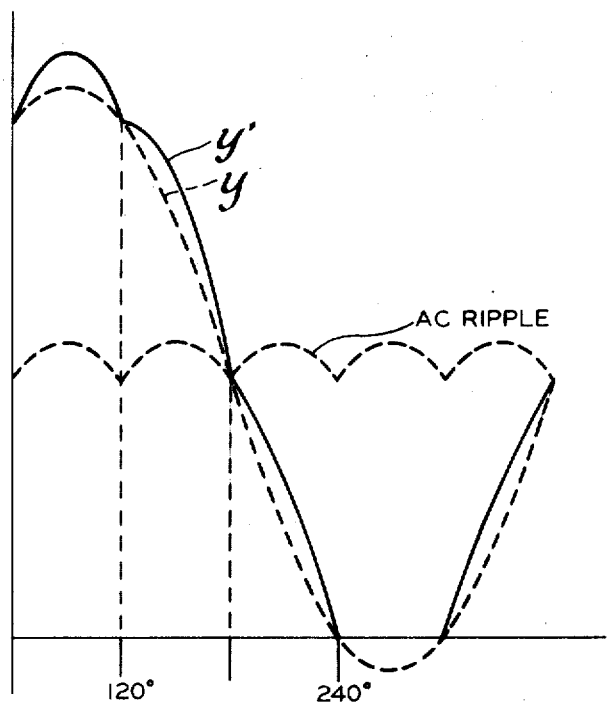
FIG. 8 is a graph depicting a ramp sinusoid and an offset DC with ripple and the combined resultant.

Reference should now be made to FIG. 8 where an offset voltage including an AC ripple is shown. This voltage is obtained by full wave rectification (not illustrated) of the voltages AB, BC, and CA applied at the inputs of the zero crossing detectors of FIG. 2. Use of this voltage as $V_{OFF}$ in the schematic of FIG. 2 enhances the compensation of the trigger control by virtue of the ripple. In FIG. 8, the pure sinusoid is labeled Y, and the combined result of the sinusoid and the rectified voltage with ripple is labeled Y'. The section of the resultant Y' from 120° to 240° would serve as a ramp in the gate firing control interval or well of FIG. 6. The resultant ramp Y' comprising the combination of a sinusoid and a rectified voltage with ripple enhances the voltage compensation by comparison with the sinusoid alone, such as is shown in FIG. 6.

Figure 9:
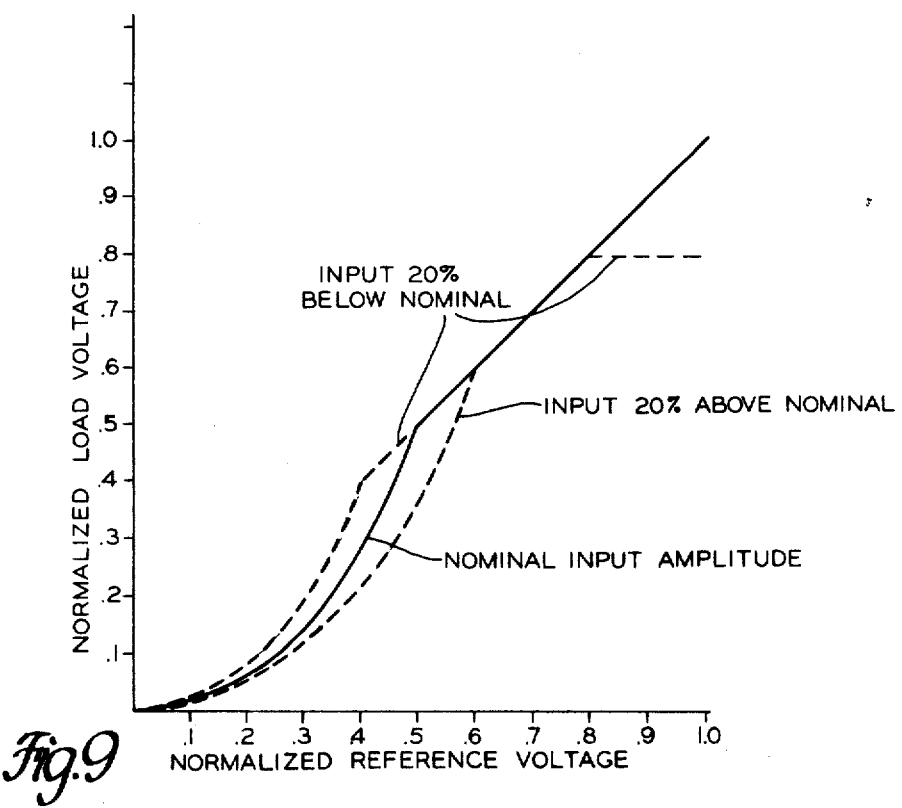
FIG. 9 is a graph of normalized load voltage versus normalized reference voltage showing the effects of variations in input voltage for the arrangement of FIG. 2 using the ramp voltage of FIG. 8.

In FIG. 9, normalized load voltage is plotted against normalized reference voltage, and the effects of variations in the input voltage level are shown when the ramp voltage of FIG. 8 is used. Changes in input voltage level of plus or minus 20 percent are fully compensated over a substantial range of the curve. Accordingly, depending on the range of operation and the anticipated voltage variations, full compensation for a particular system is possible with the full wave rectified offset voltage of FIG. 8.

Figure 10:
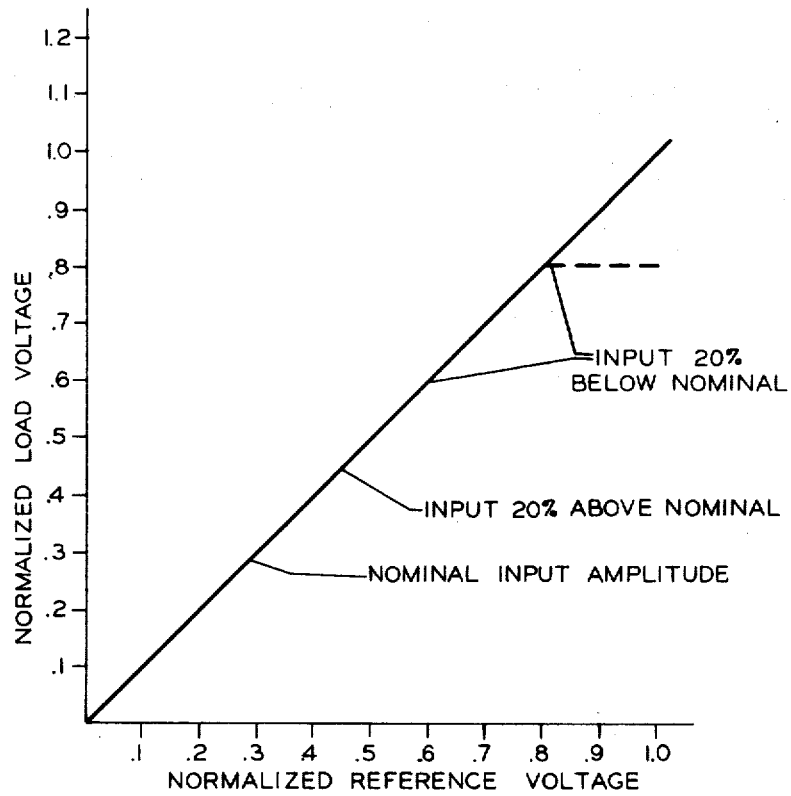
FIG. 10 is a graph of normalized load voltage versus normalized reference voltage showing the effects of variations in input voltage when the optimal ramp voltage is used in the system of FIG. 2.

By proper selection of sine wave segments for the ramp within the gate firing interval and by appropriate choice of offset voltage, a unique, optimum solution in terms of compensation is derived. The optimum solution yields a normalized load voltage versus normalized reference voltage characteristic as shown in FIG. 10. The optimum ramp voltage is synthesized by joining the sine wave portions 30° to 150° and 210° to 330° and using the 120° section including the 90° to 150° portion and the 210° to 270° portion as the ramp. The 150° point joins the 210° point in the middle of the 120° gate firing interval. The DC offset voltage required with this ramp voltage is one-half the peak value of the input sinusoids to the zero crossing detectors. As shown in the graph of FIG. 10, the optimum solution fully compensates for voltage variations within the limits of the input voltage to provide the selected output.

The requisite voltage ramps for the unique, optimum solution can be developed by processing the voltages AB, BA, BC, CB, CA, and AC of FIG. 2. To develop the requisite ramps, a logic array would be interposed between the six inputs AB, BA, BC, CB, CA, and AC and the summing amplifiers 46, 48, 50, 52, 54, and 56, replacing the direct connections illustrated in FIG. 2. Inasmuch as the logic operations required to synthesize the optimum ramp are within the capability of one skilled in the art, no specifics are shown or discussed herein. The offset voltage $V_{OFF}$ of FIG. 2 would, as noted, have an amplitude equal to one-half the peak value of the input sinusoids, and this offset voltage could be obtained by rectification and calibration (not illustrated) of the input sinusoids.

Figure 11:
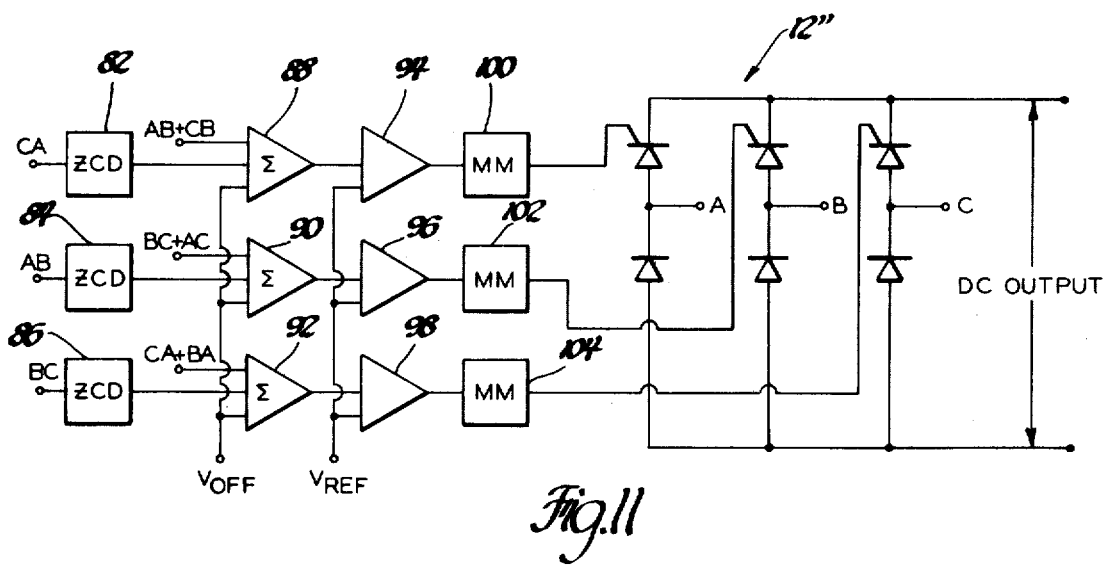
FIG. 11 is a schematic, partially in block form, showing the bridge control required for a bridge rectifier having three controlled rectifiers and three diodes.

Reference should now be made to FIG. 11 wherein a half-wave bridge rectifier including gate firing control according to the present invention is shown partially in block form.

Three diodes and three controlled rectifiers are included in a bridge rectifier 12'' with the three controlled rectifiers gated during gate control intervals to regulate the DC voltage output from the bridge rectifier. Three input signals CA, AB, and BC related to the voltage applied to the AC input terminals of the bridge rectifier are applied to three zero crossing detectors 82, 84, and 86. The waveforms AB, BC, and CA can be obtained in the fashion described above and shown in FIG. 3.

The zero crossing detectors operate in the manner described above and exemplified by the timing diagram of FIG. 5 to provide output signals characterized by high level voltage when the input is positive and low level voltage when the input is negative. Inasmuch as the bridge rectifier 12'' only has a half-wave control, the gate firing intervals are 180° rather than 120°. The output signals from the zero crossing detectors accordingly define gate firing intervals or gate firing wells of 180° duration and the three output signals are phase shifted 120° with respect to each other.

Three summing amplifiers 88, 90, and 92 combine the voltage signals from the zero crossing detectors with an appropriate offset voltage and a ramp voltage to define the voltage waveform in the gate firing interval. The sinusoidal voltage input to the summing amplifier 88 is the voltage derived by adding the line voltage AB with the voltage CB. The ramp voltage input to the summing amplifier 90 is the sinusoid derived by adding the voltage BC with the voltage AC. And the ramp voltage applied to the input of the summing amplifier 92 is the sinusoid derived by adding the voltage CA to the voltage BA. The voltages AB, BC, CA, CB, AC, and BA are the voltages AB, BC, and CA and their inverses derived as discussed above. The offset DC voltage has an amplitude equal to $\sqrt{3}$ times the peak value of the input sinusoids to the zero crossing detectors. In the half-wave rectifier requiring 180° of control, sine wave ramp voltages offset by a DC voltage as described above provide optimum control in terms of compensation over the full control range.

The outputs from the summing amplifiers define gate firing intervals and ramp voltage control signals within the respective intervals. As noted with regard to the summing amplifiers of the system of FIG. 2, each summing amplifier in FIG. 11 is driven to saturation by the high level output from the associated zero crossing detector.

A reference control voltage $V_{REF}$ is compared with the respective outputs of the summing amplifiers in an associated comparator 94, 96, or 98. When the voltage from the summing amplifier decreases in value to a level below the reference voltage, the associated comparator changes state initiating a pulse by the multivibrator connected to the output of that comparator. Multivibrator 100 initiates a pulse in response to the comparator 94, multivibrator 102 initiates a pulse in response to the comparator 96, and multivibrator 104 initiates a pulse in response to the comparator 98. In the drawing, the multivibrators are shown connected directly to respective controlled rectifiers of the bridge 12''. It should be appreciated that a gate and cathode connection would be required in an operating bridge arrangement and additionally, as discussed above, alternative trigger arrangements could be adapted providing variable frequency capability.

Although the foregoing has proceeded in terms of specific preferred embodiments, it should be appreciated that various changes and modifications could be engrafted thereon within the spirit and scope of the appended claims.

I claim:

1. A gate firing control system for six controlled rectifiers interconnecting an electrical load with a three-phase alternating current source providing three-phase voltages A, B, and C, comprising: a logic array providing six gate firing intervals synchronized respectively to afford controlled gating of an associated controlled rectifier; means for developing six equal amplitude sinusoids having the phases respectively of the sinusoids AB, BC, CA, BA, CB, and AC; means for developing an offset voltage, said offset voltage being an unfiltered three-phase rectified voltage having a peak amplitude equal to the peak amplitude of said six equal amplitude sinusoids; means for combining said offset voltage with said six equal amplitude sinusoids to define six firing control ramps for use respectively in said six gate firing intervals; a reference control voltage; means for comparing said reference control voltage with said six firing control ramps to develop a control signal in each gate firing interval when the reference voltage and the associated firing control ramp have a predetermined relationship; and trigger means connected with said last named means for each controlled rectifier to initiate a gate firing signal on the occasion of each control signal in the gate firing intervals associated with the respective controlled rectifier and to maintain the gate firing signal for 120° at the frequency of operation.

2. A gate firing control system for six controlled rectifiers interconnecting an electrical load with a three-phase alternating current source providing three-phase voltages A, B, and C, comprising: a logic array providing six 120° gate firing intervals synchronized respectively to afford controlled gating of an associated controlled rectifier; means for synthesizing a ramp voltage for each 120° gate firing interval, each of said ramp voltages comprising two sine wave portions joined in the centers of said 120° gate firing intervals, each of said ramp voltages including 90° to 150° and 210° to 270° portions of sine waves with the 150° point joined to the 210° point; means for developing a DC offset voltage having an amplitude equal to one-half the peak value of the sine waves used in synthesizing said ramp voltages; means for combining said offset voltage with said ramp voltages to define six firing control ramps for use respectively in said six gate firing intervals; a reference control voltage; means for comparing said reference control voltage with said six firing control ramps to develop a control signal in each gate firing interval when the reference voltage and the associated firing control ramp have a predetermined relationship; and trigger means connected with said last named means for each controlled rectifier to initiate a gate firing signal on the occasion of each control signal in the gate firing intervals associated with the respective controlled rectifier and to maintain the gate firing signal for 120° at the frequency of operation.

3. A gate firing control system for a plurality of controlled rectifiers interconnecting an electrical load with a three-phase alternating current source providing three-phase voltages A, B, and C, comprising: a plurality of transformers connected with said source and developing the voltages AB, BC, CA, BA, CB, and AC; a logic array connected with said transformers and supplied voltages developed by said transformers operative to provide gate firing intervals synchronized respectively for gate control of an associated controlled rectifier; means for developing an offset voltage; a plurality of summing amplifiers connected with said transformers, said logic array and said offset voltage developing means combining said offset voltage with said voltages developed by said transformers to define firing control ramps in said gate firing intervals; a reference control voltage; a plurality of comparators for comparing said reference control voltage with said firing control ramps to develop a control signal in each gate firing interval when the reference voltage and the associated firing control ramp have a predetermined relationship; and a plurality of multivibrators connected respectively with said comparators to initiate gate firing signals for respective controlled rectifiers on the occasion of control signals in the associated gate firing intervals.

* * * * *